Sept. 19, 1961 J. M. SIPRESS ET AL 3,001,157

NONRECIPROCAL WAVE TRANSLATING NETWORK

Filed Oct. 30, 1959

3 Sheets-Sheet 1

INVENTORS J. M. SIPRESS
F. J. WITT

BY Sylvan Sherman
ATTORNEY

Sept. 19, 1961 J. M. SIPRESS ET AL 3,001,157

NONRECIPROCAL WAVE TRANSLATING NETWORK

Filed Oct. 30, 1959 3 Sheets-Sheet 2

INVENTORS J. M. SIPRESS
F. J. WITT

BY Sylvan Sherman
ATTORNEY

INVENTORS J. M. SIPRESS
F. J. WITT
BY *Sylvan Sherman*
ATTORNEY

United States Patent Office 3,001,157

Patented Sept. 19, 1961

3,001,157

NONRECIPROCAL WAVE TRANSLATING NETWORK

Jack M. Sipress and Francis J. Witt, Summit, N.J., assignors to Bell Telephone Laboratories, Incorporated, New York, N.Y., a corporation of New York Filed Oct. 30, 1959, Ser. No. 849,818
5 Claims. (Cl. 333—80)

This invention relates to nonreciprocal signal translating networks and in particular to gyrators.

A gyrator may be defined as a four-terminal element in which the following relationships exist (see FIG. 1):

$$I_1 = -Y_1 E_2$$
$$I_2 = Y_2 E_1$$

Since the coefficients of the voltage terms are of opposite sign and, in general, are unequal, the gyrator violates the principle of reciprocity. This is in marked contrast to networks composed of the usual electrical elements such as resistors, capacitors, inductors and transformer, in that such elements, individually, and in combination, satisfy the reciprocity theorem.

In simple terms, the reciprocity theorem states that if a voltage source is inserted at one point in a network, and if the current produced thereby at some other part of the network is measured, the ratio of the measured current to the applied voltage, called the transfer admittance, will be the same if the relative positions of the driving source and the measured effect are reversed.

In the gyrator, however, the transfer admittance for one direction of propagation differs in sign from that for propagation in the other direction and their magnitudes may, in general, be unequal.

One very important application of the gyrator is as an impedance inverter, i.e., if an impedance Z is connected between one pair of terminals, the impedance measured at the other terminals is proportional to 1/Z. Thus, a capacitor, with capacitance C, may be made to appear as an inductor whose inductance is proportional to C.

Network synthesis, in the past, has been based upon the existence of four basic circuit elements, the capacitor, the resistor, the inductor and the ideal transformer. It is apparent that the introduction of a fifth circuit element, such as a gyrator, leads to considerably improved solutions for many network problems.

Gyrators have been realized, in the past, by means of mechanically coupled piezoelectric and electromagnetic transducers, by means of electromagnetic coupling through Hall effect materials, and most recently, by means of electromagnetic coupling to gyromagnetic materials at microwave frequencies.

It is an object of this invention to produce gyrator action at frequencies at which lumped parameter circuit components are used.

It is a further object of this invention that such gyrator networks be broad-band, stable and simple in construction and operation.

In accordance with the invention, gyrator action is produced by means of a combination of active and passive circuit components. In particular, one embodiment of the invention comprises two parallel connected signal paths, one of which includes, in cascade, a voltage amplifier, a voltage-to-current transducer, a current phase inverter, and a current amplifier. The second path includes, in cascade, a voltage amplifier, a voltage-to-current transducer, and a current amplifier.

The circuit functions described above may be realized using vacuum tubes, transistors or other similar active elements. A transistorized embodiment of the invention is shown and means are suggested for simplifying the basic circuit.

It should be noted that in the various networks to be described in greater detail hereinafter, gyrator action is achieved through the use of special circuit configurations rather than as a result of the particular adjustment of one or more parameters of the circuit. In the prior art class of networks, the operation of the circuit as a gyrator is directly a function of these specially adjusted parameters and, as a result, the circuit is quite sensitive to variations in environment, and aging of the particular elements of which the given parameters are descriptive.

The performance of a gyrator, in accordance with the present invention, on the other hand, is substantially independent of variations in the parameters of the active circuit elements. Consequently, the accuracy of the gyrator action is relatively insensitive to changes in the circuit components or variations in environment, such as temperature, line voltage, etc.

These and other objects and advantages, the nature of the present invention, and its various features, will appear more fully upon consideration of the various illustrative embodiments now to be described in detail in connection with the accompanying drawings, in which.

Figure 1:
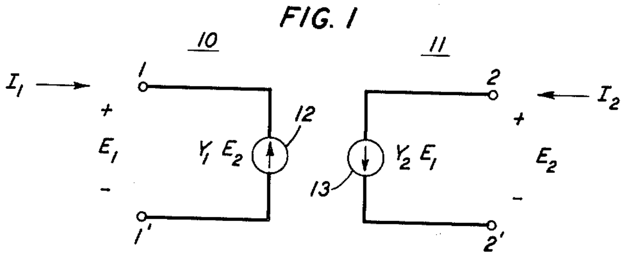
FIG. 1 is an equivalent circuit of a gyrator.

Referring more specifically to FIG. 1, there is shown an equivalent circuit diagram of a gyrator. The circuit comprises the two meshes 10 and 11, each of which, ideally, has zero short-circuit self-admittance. Coupling between the meshes is provided by means of the transfer admittances $-Y_1$ and $Y_2$. Specifically, the coupling is in the form of an induced current in each of the loops which is proportional to the voltage at the terminals of the other of the loops. These are represented by the currents $Y_1E_2$ and $Y_2E_1$ emanating from the current generators 12 and 13, respectively.

To physically realize such a network, in accordance with the invention, several idealized circuit components are postulated. These include a voltage amplifier and a current amplifier.

Figure 2A:
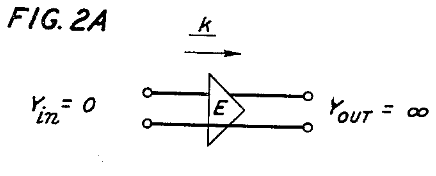
FIGS. 2A and 2B show, by way of illustration, an ideal voltage amplifier and a transistor equivalent circuit.

An idealized voltage amplifier, as contemplated by the invention, is shown symbolically in FIG. 2A. It has zero input admittance, infinite output admittance, a voltage gain of $k$ in the forward direction, and zero current gain in the reverse direction.

Figure 3A:
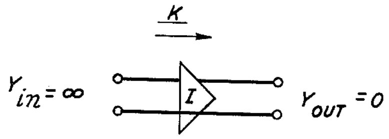
FIGS. 3A and 3B show, by way of illustration, an ideal current amplifier and a transistor equivalent circuit.

The ideal current amplifier, shown symbolically in FIG. 3A, has infinite input admittance, zero output admittance, a current gain of K in the forward direction, and zero voltage gain in the reverse direction.

Both of these circuit components may be approximated, in general, by using any of the well known active circuit elements or combinations thereof. Because of the many advantages enjoyed by transistors, however, the various embodiments of the present invention will be illustrated using transistors as the active elements.

The transistor, ideally, may be regarded as a device whose collector and emitter currents are substantially equal, whose base current is zero (negligible with respect to the emitter or collector current), and whose emitter-to-base voltage is also negligibly small. To the extent that these assumptions depart from the ideal, the resulting amplifier circuits depart from the postulated ideal.

Figure 2B:
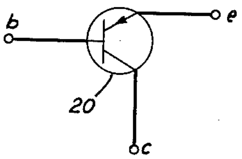

Based upon the above enumerated characteristics of the transistor, the voltage amplifier of FIG. 2A can be realized by the common collector connection of the transistor as shown in FIG. 2B. This equivalence is obtained by connecting the input between base terminal $b$ and collector terminal $c$ of transistor 20, and the output between emitter terminal $e$ and collector terminal $c$.

Figure 3B:
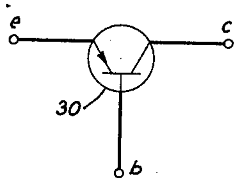

The current amplifier of FIG. 3A can be implemented as indicated in FIG. 3B, by means of the common base transistor connection. In this configuration, the input is between the emitter $e$ and base $b$ of transistor 30, and the output is between the collector $c$ and base $b$.

It should be noted, however, that voltage gain $k$ of the transistor voltage amplifier shown in FIG. 2B and the current gain K of the transistor current amplifier shown in FIG. 3B are both unity.

Figure 4A:
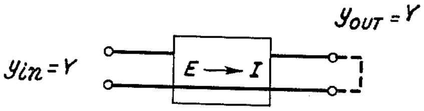
FIGS. 4A and 4B show, by way of illustration, a voltage-to-current transducer and a network equivalent.
Figure 4B:
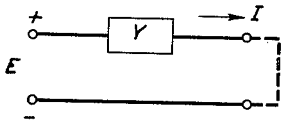

Two additional circuit elements should be briefly considered. The first of these is a voltage-to-current transducer, shown symbolically, in FIG. 4A. This component has a finite short-circuit input and output admittance of amplitude Y, and is readily realizable by means of a simple series admittance Y, as shown in FIG. 4B. A voltage E applied to the admittance Y produces a short-circuit current I equal to EY, as indicated in FIG. 4B.

Figure 5A:
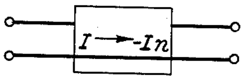
FIGS. 5A and 5B show, by way of illustration, a phase inverter and a network equivalent.
Figure 5B:
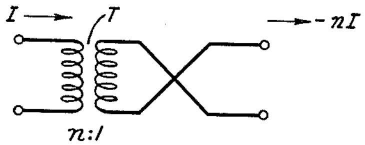

The second of these additional circuit elements is a phase inverter, shown symbolically in FIG. 5A. In its simplest form, phase inversion may be obtained by means of the transformer T of FIG. 5B. By appropriately arranging the input and output terminals, a current I applied to one pair of terminals will produce a current $-n$I between the other pair of terminals, where the turns ratio is $n$:1.

Figure 6C:
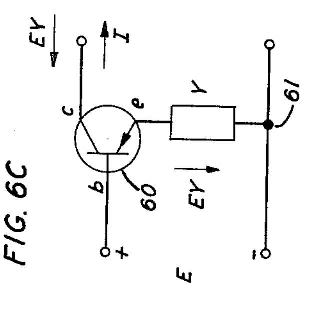
FIGS. 6A, 6B and 6C show, by way of illustration, a combined current-to-voltage transducer and phase inverter, its network equivalent and a transistor equivalent circuit.
Figure 6B:
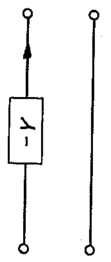
Figure 6A:
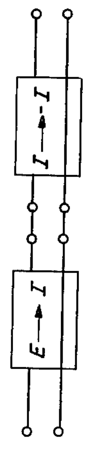

While a transformer is a reasonable phase inverter, the functions of the voltage-to-current transducer, and the phase inverter may be combined in a single transistor stage. Such an arrangement of circuit functions is indicated in FIG. 6A and is equivalent to the series negative admittance —Y shown in FIG. 6B. The transistor equivalent, shown in FIG. 6C, comprises a transistor 60 with an admittance Y connected between the emitter terminal and the common junction 61. A voltage E applied between the base terminal $b$ and the common junction 61 will, since the emitter-to-base voltage is negligibly small, appear across admittance Y and cause a current EY to flow from the emitter terminal $e$ to the common junction 61. Since the base current is zero, all the current thus caused to flow will enter the transistor at the collector C.

Figure 7:
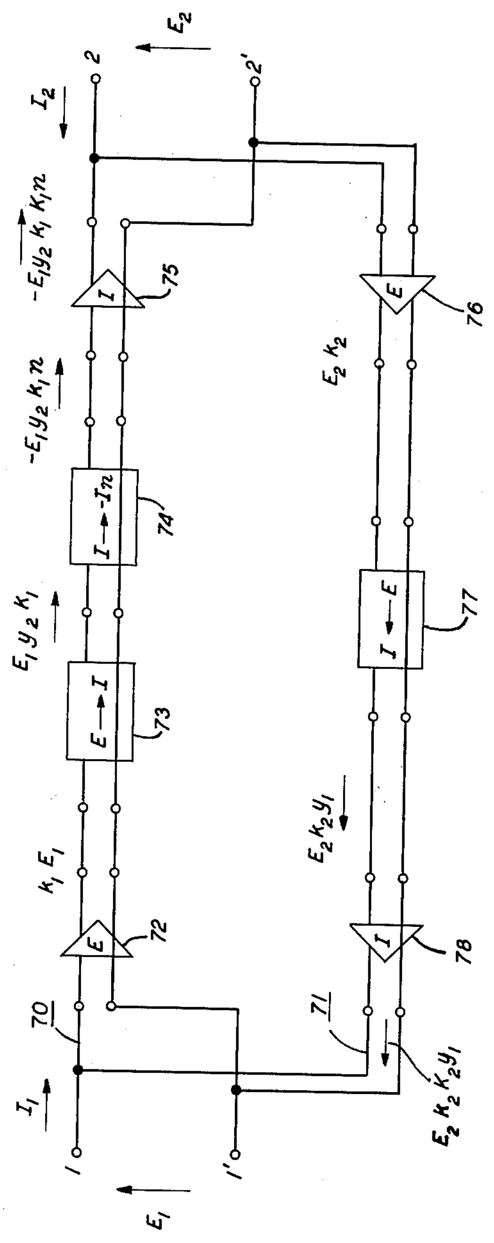
FIG. 7 shows, in block diagram, a gyrator circuit in accordance with the invention.

The gyrator, represented by FIG. 1, can now be realized by a combination of the four above-described circuit elements in the manner shown in FIG. 7. The circuit comprises two unilateral signal paths 70 and 71. Path 70 includes, in cascade, the voltage amplifier 72, the voltage-to-current transducer 73, the current phase inverter 74 and the current amplifier 75. The second path, 71, includes, in cascade, the voltage amplifier 76, the voltage-to-current transducer 77, and the current amplifier 78. The two networks are interconnected at each end by connecting the input of path 70 in parallel with the output of path 71 to form one pair of terminals 1—1′, and by connecting the output of path 70 in parallel with the input of path 71 to form the second pair of terminals 2—2′.

In operation, a voltage $E_1$ is applied to terminals 1—1′. Since current amplifier 78 is not responsive to a voltage applied to its output terminals, path 71 is not energized. However, voltage $E_1$ energizes voltage amplifier 72 which produces an output voltage $k_1E_1$. Voltage $k_1E_1$ is, in turn, converted to a current $k_1E_1y_2$ by the action of the voltage-to-current transducer 73. The phase of this current is then reversed in the phase inverter 74 to produce a current $-nk_1E_1y_2$ which is, in turn, applied to current amplifier 75. The entire output of the current amplifier constitutes the output current $I_2$, i.e., $$I_2=+nk_1K_1y_2E_1$$

since, as postulated above, the input admittance of the voltage amplifier 76 is zero.

In the reverse direction, a voltage $E_2$ applied at terminals 2—2′ energizes voltage amplifier 76. The output $k_2E_2$ of the voltage amplifier is converted to a current $k_2y_1E_2$ which is amplified in current amplifier 78 and appears at the output as a current $I_1=-k_2K_2y_1E_2$, since the input admittance of voltage amplifier 72 is zero.

Based upon the assumptions made regarding the various circuit components, the network is seen to have the properties of the ideal gyrator. For example, the short-circuit input, or self-admittance of the network, as viewed at either port 1—1′ or 2—2′, is zero since it was postulated that the output admittance of the current amplifier and the input admittance of the voltage amplifier are both zero. The transfer admittance, or the ratio of the output current to the input voltage in the direction from terminals 1—1′ to terminals 2—2′ is seen to be $$\frac{I_2}{E_1}$$

equal to $+y_2k_1K_1n=+Y_2$, whereas the transfer admittance in the reverse direction $$\frac{I_1}{E_2}$$

is equal to $-y_1k_2K_2=-Y_1$.

Figure 8:
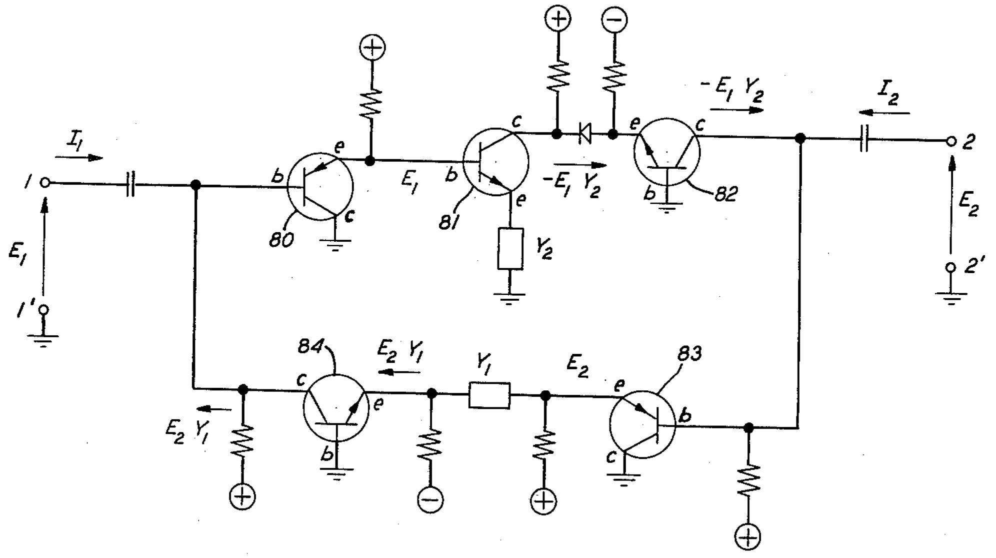
FIG. 8 is a transistorized embodiment of the gyrator circuit of FIG. 7.

By substituting the transistor equivalents of the several network functions that were utilized in the realization of the circuit, as illustrated in FIG. 7, there is obtained the transistorized gyrator circuit of FIG. 8. The upper portion of this network comprising transistors 80, 81 and 82 corresponds to the path 70 of FIG. 7. Transistor 80, connected in the common collector configuration, corresponds to the voltage amplifier 72. Transistor 81, having an admittance $Y_2$ in the emitter circuit, comprises the voltage-to-current transducer and phase inverter of FIG. 6C and corresponds to elements 73 and 74 of FIG. 7. Transistor 82, connected in the common base arrangement, functions as the current amplifier 75.

In the reverse direction, starting from terminals 2—2′, transistor 83, connected in the common collector configuration, represents the voltage amplifier 76 of FIG. 7, admittance $Y_1$ corresponds to the voltage-to-current transducer 77, while transistor 84, in the common base configuration, corresponds to the current amplifier 78.

Also shown in FIG. 8, but not identified, are the various resistors, diodes, and capacitors with their associated direct current power sources for establishing the necessary operating biases in the several transistors.

In operation, a voltage $E_1$, applied across terminals 1—1′, activates the voltage amplifier 80 and produces a voltage $E_1$ at the base of transistor 81. Voltage $E_1$ is converted to a current $-E_1Y_2$ by transistor 81, which current is amplified by transistor 82 and appears as the output current $I_2=+E_1Y_2$ at terminal 2.

In the reverse direction, a voltage $E_2$ applied to terminals 2—2′ is amplified by transistor 83, and converted to a current $E_2Y_1$ by admittance $Y_1$. Current $E_2Y_1$ is, in turn, amplified by transistor 84 and appears as the output current $I_1=-E_2Y_1$ at terminal 1.

The two equations $$I_1 = -Y_1 E_2$$
$$I_2 = Y_2 E_1$$

correspond to the equations descriptive of the gyrator network shown in FIG. 1. It should be noted that in the transistorized embodiment of the gyrator of FIG. 8, the constants $k_1$, $k_2$, $K_1$, $K_2$ and $n$ are all equal to unity.

It is evident from the equivalent circuit of FIG. 1 that for the ideal gyrator, both the input and output short-circuit self admittances are zero. Based upon the idealized properties of the network components herein postulated, the short-circuit input and output self-admittances of the circuit of FIG. 8 are also zero, since the input admittance of voltage amplifiers 80 and 83, and the output admittance of current amplifiers 82 and 84 are zero.

In the ideal case some simplification of the circuit of FIG. 8 may be effected without adversely affecting the properties of the idealized gyrator. This is so since the input and output admittance of the idealized voltage-to-current converter and phase inverter 81 is also zero. Thus, voltage amplifier 80 or current amplifier 82 or both may be omitted. In the nonideal or practical case, however, the effect of these omissions is to introduce slightly more self-admittance to the gyrator than would normally be present if the above-mentioned amplifiers remained in the circuit. However, to the extent that this is not objectionable, the circuit may be simplified, as shown in FIG. 9.

Figure 9:
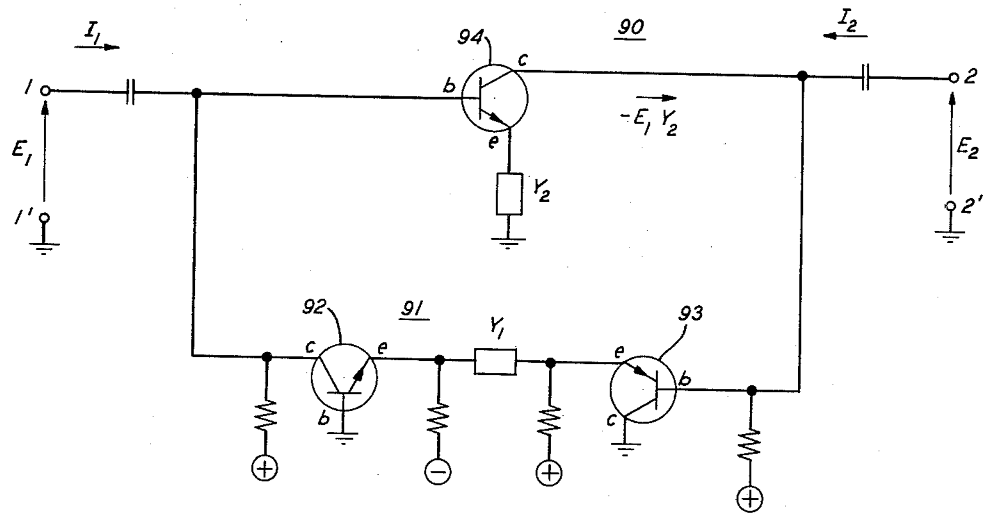
FIG. 9 is a simplified circuit derived from the embodiment of FIG. 8.

In the embodiment of FIG. 9, the path 90 has been simplified by the omission of the two above-mentioned components, reducing this transmission path to a single transistor 94 and admittance $Y_2$, which converts the input voltage $E_1$ to an output current $I_2 = +E_1 Y_2$. This simplification is possible because of the low input and output admittance of the combination voltage-to-current transducer and phase inverter stage comprising transistor 94 and admittance $Y_2$.

Transmission in the reverse direction along path 91 is, as before, through the voltage amplifier 93, the voltage-to-current transducer $Y_1$, and the current amplifier 92.

In the various illustrative embodiments of the invention described, both n-p-n and p-n-p type transistors were used. The intermingling of both types of transistors within any one network was merely an expedient for simplifying the biasing arrangements. Obviously, by making the appropriate changes in the biasing circuits, one or the other of the two types of transistors could be used exclusively.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A nonreciprocal signal translating network comprising two signal paths, the input of one of said paths being connected in parallel with the output of the other of said paths, the input of the other of said paths being connected in parallel with the output of said one path, said one path comprising a voltage-to-current transducer and phase inverter, and said other path comprising in cascade a voltage amplifier, a voltage-to-current transducer and a current amplifier.

2. A nonreciprocal signal translating network comprising two signal paths, the input of one of said paths being connected in parallel with the output of the other of said paths, the input of the other of said paths being connected in parallel with the output of said one path, said one path comprising in cascade a voltage amplifier, a voltage to current transducer, a phase inverter and a current amplifier, and said other path comprising in cascade a voltage amplifier, a voltage-to-current transducer and a current amplifier.

3. A gyrator comprising, in combination a plurality of transistors each having a semiconductor body, an emitter, a collector and a base electrode in contact with said body, means for connecting the emitter of a first transistor to the base of a second transistor, means for connecting the collector of said second transistor to the emitter of a third transistor, means for connecting the collector of said third transistor to the base of a fourth transistor, means for connecting a first admittance $Y_1$ between the emitter of said fourth transistor and the emitter of a fifth transistor, means for connecting the collector of said fifth transistor to the base of said first transistor, means for connecting the collector of said first transistor the base of said third transistor, the collector of said fourth transistor and the base of said fifth transistor to a common terminal, means for connecting a second admittance $Y_2$ between the emitter of said second transistor and said common terminal, input means connected between the base of said first transistor and said common terminal, output means connected between the base of said fourth transistor and said common terminal, and means for applying bias to said transistors.

4. The combination according to claim 3 wherein said first admittance and said second admittance are equal.

5. A gyrator comprising in combination a plurality of transistors each having a semiconductor body, an emitter, a collector, and a base electrode in contact with said body, means for connecting a first admittance $Y_1$ between the emitter of a first transistor and the emitter of a second transistor, means for connecting the collector of said second transistor to the base of a third transistor, means for connecting the base of said first transistor to the collector of said third transistor, means for connecting the collector of said first transistor and the base of said second transistor to a common junction, means for connecting a second admittance $Y_2$ between the emitter of said third transistor and said common junction, input means connected between the collector of said second transistor and said common junction, output means connected between the base of said first transistor and said common junction, and means for applying bias to said transistors.

References Cited in the file of this patent

UNITED STATES PATENTS

| | | |
|---|---|---|
| 2,685,066 | Barney | July 27, 1954 |
| 2,923,784 | Flanagan | Feb. 2, 1960 |